United States Patent [19]

Zaganiacz

[11] 4,139,517

[45] Feb. 13, 1979

[54] TRANSPARENT PIGMENTED POLYCARBONATE CONTAINER

[75] Inventor: Frederick J. Zaganiacz, Pittsburgh, Pa.

[73] Assignee: Mobay Chemical Corporation, Pittsburgh, Pa.

[21] Appl. No.: 854,874

[22] Filed: Nov. 25, 1977

[51] Int. Cl.$^2$ .............................................. C08K 3/22
[52] U.S. Cl. .............................. 260/37 PC; 215/1 C; 426/107
[58] Field of Search ....................... 426/107; 215/1 C; 260/37 PC

[56] References Cited

U.S. PATENT DOCUMENTS

| | | | |
|---|---|---|---|
| 2,598,506 | 5/1952 | Coe | 426/107 X |
| 2,964,794 | 12/1960 | Peilstöcker et al. | 215/1 C X |
| 4,051,265 | 9/1977 | Kirshenbaum et al. | 215/1 C X |

*Primary Examiner*—Sandra M. Person
*Attorney, Agent, or Firm*—Gene Harsh; Lawrence S. Pope; Frederick H. Colen

[57] ABSTRACT

The present invention pertains to a reusable, transparent, pigmented, polycarbonate container which selectively filters out the portion of the visible spectrum of from about 380 to 550nm. In a preferred embodiment, the pigmented, polycarbonate bottle is a milk bottle.

6 Claims, 1 Drawing Figure

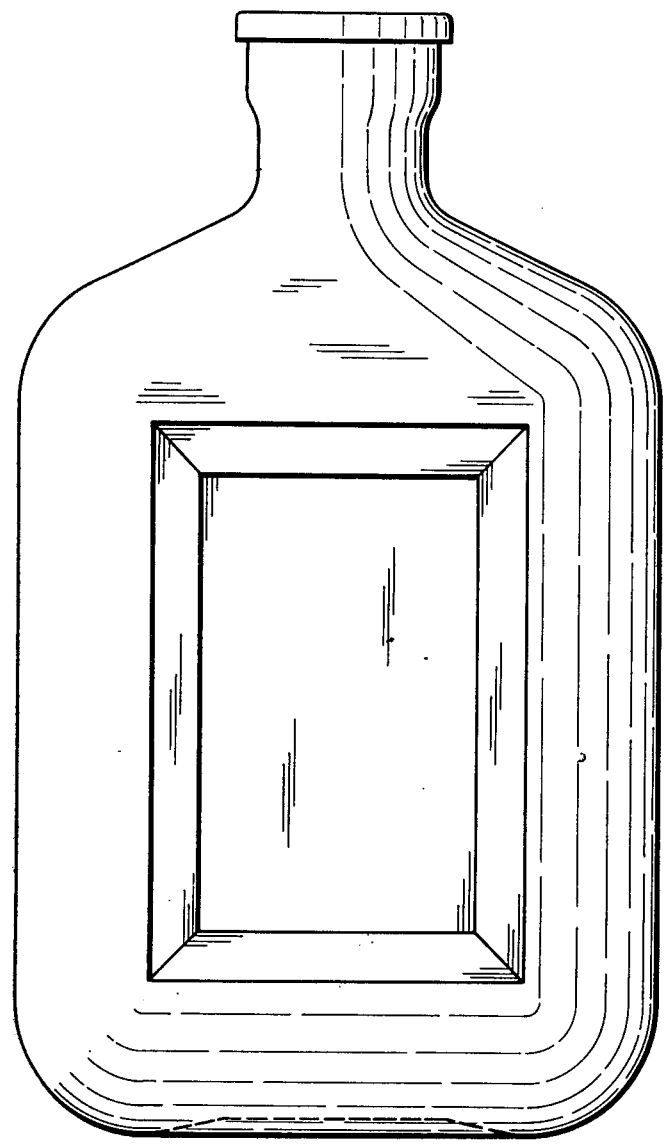

TRANSPARENT PIGMENTED POLYCARBONATE CONTAINER

BACKGROUND OF THE INVENTION

It is generally recognized that light-induced reactions may have a deleterious effect on the quality of a variety of foods, especially those foods containing fat. This problem has become more pronounced in recent years with the advent of high intensity fluorescent lights for illumination of display cases in supermarkets and convenience stores.

Flavor changes in milk after exposure to light has been repeatedly described in the literature. Reported results are confusing, but there is apparent agreement that a. oxidized and sunlight flavor are the two principal off-flavors induced by light, b. the wavelengths of light inducing the off-flavor reactions are within the range of the visible spectrum, specifically 380 to 750 nm, c. the absence of air retards off-flavor development; and d. riboflavin and tryptophane destruction are directly related to the flavor defect.

See the article entitled "Controlling Light Activated Flavor In Milk" by M. E. Gregory, A. P. Hansen and L. W. Aurand appearing in a North Carolina Food Extension Service Pamphlet entitled "Timely Tips" dated November, 1970.

The effect of artificial light on milk has gained wide attention in recent years with the increasing popularity of all-plastic containers. These all-plastic containers which may be clear or opaque generally suffer from the same deficiency as glass containers with respect to light transmittance characteristics. Thus, as compared to plastic-coated paper containers, such all-plastic containers absorb or filter out less of the deleterious range of the visible spectrum which in turn generally results in milk packaged in these containers having an off-flavor or oxidized flavor after being exposed to fluorescent light or sunlight for between about 12 to 24 hours.

It is desirous that these all-plastic, milk containers filter out the deleterious range of the visible spectrum and simultaneously be transparent to give the milk an aesthetic and pleasing appearance. Conventional all-plastic, clear containers, such as the polycarbonate containers disclosed in U.S. Pat. No. 2,964,794, are transparent and give the milk an aesthetic and pleasing appearance, but fail to absorb or filter out the deleterious range of the visible spectrum. Conventional plastic-coated paper containers effectively filter out the deleterious range of the visible spectrum, but completely conceal the appearance of the contained milk. Conventional high density polyethylene containers pigmented with titanium dioxide ineffectively filter out or absorb the deleterious range of the visible spectrum and being opaque, fail to give the milk an aesthetic and pleasing appearance.

In order to reduce the light transmission characteristics of an all-plastic container in the 380–750 nm visible spectrum range, it has been proposed to coextrude a laminate consisting of an outer all-plastic layer and an inner black pigmented layer. Such a coextruded laminate is disclosed in J. Inst. Can. Sci. Technol. Aliment, Vol. 6, No. 3, 1973 in an article entitled "Effect of Packaging Material on Light Induced Quality Deterioration of Milk" by Abdus Sattar and John M. deMan. Such a container reduces the transmission to well below 2% in the greater part of the visual spectrum. However, such a coextruded laminate system can only be used to mold a container by extrusion or injecting blow molding techniques if expensive and highly complicated machinery is used. Furthermore, adhesion problems between the plastic and pigmented layer is likely to occur after repeated washings requiring that a third or adhesive layer be blow molded between the plastic and pigmented layer. The requirement of such a third or adhesion layer makes the extrusion or injection blow molding process even more complicated and expensive.

U.S. Pat. No. 2,598,506 discloses a process for inhibiting deleterious photochemical action in packaged, edible dairy products by shielding the products from the harmful light wavelengths of the visible spectrum. The shielding is accomplished by a color screen which may be a lacquer or a laminate applied to the package. Although this shielding process is generally effective for most plastics, it suffers from the shortcomings that the shield may be difficult to lacquer or to laminate to all plastic containers, such as polycarbonate containers, and that once lacquered or laminated to the plastic container, the shield may have a tendency to separate from the container or dissolve after repeated washings of the container in basic or acidic detergent solutions.

In accordance with the present invention, a reusable, polycarbonate container has been developed which filters out the portion of the visible spectrum of from about 380 to 550 nm and which is transparent and gives its contents an aesthetic and pleasing appearance.

SUMMARY OF THE INVENTION

The present invention pertains to a reusable, transparent, pigmented polycarbonate container which selectively filters out the portion of the visible spectrum of from about 380 to 550 nm, and to a process for producing a reusable polycarbonate container which selectively filters out the portion of the visible spectrum of from about 380 to 550 nm comprising intimately incorporating an effective amount of pigment into the polycarbonate from which the reusable container is formed to filter out said portion of the visible spectrum.

DETAILED DESCRIPTION OF THE INVENTION

The reusable containers of the present invention are formed from aromatic polycarbonates preferably having a weight average molecular weight of from about 10,000 to 200,000, most preferably from about 20,000 to 80,000, and most particularly a melt flow rate range of from about 1 to 24 g/10 min (ASTM D-1238) and which are prepared by methods known to those skilled in the art and more particularly by methods disclosed in German Pat. Nos. 926,274 and 1,046,311 and in U.S. Pat. Nos. 3,028,365, 2,999,846, 3,248,414, 3,153,008, 3,215,668, 3,187,065, 2,964,794, 2,970,131, 2,991,273 and 2,999,835, all incorporated herein by reference.

The aromatic polycarbonates useful in practice of the invention are produced by reacting di-(monohydroxyaryl)-alkanes or dihydroxybenzenes and substituted dihydroxybenzenes with derivatives of carbonic acid such as carbonic acid diesters, phosgene, bis-chlorocarbonic acid esters of di-(monohydroxyaryl)-alkanes and the bis-chlorocarbonic acid esters of the dihydroxy-benzenes and the substituted dihydroxy-benzenes.

By aromatic polycarbonate, in the sense of the present invention, there are understood homopolycarbonate and copolycarbonate resins which are based, for example, on one or more of the following bisphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α, α-bis-(hydroxyphenyl)-diisopropylbenzenes, as well as their nuclear-alkylated and nuclear-halogenated compounds. These and further suitable aromatic dihydroxy compounds are described, for example, in U.S. Pat. Nos. 3,028,365, 2,999,835, 3,148,172, 3,271,368, 2,991,273, 3,271,367, 3,280,078, 3,014,891 and 2,999,846 (all incorporated herein by reference), in German Offenlegungsschriften (German Published Specifications) 1,570,703, 2,063,050, 2,063,052, 2,211,956 and 2,211,957, in French Patent Specification No. 1,561,518 and in the monograph "H. Schnell, Chemistry and Physics of Polycarbonates, Interscience Publishers, New York, 1964".

Preferred bisphenols are those of the formula I

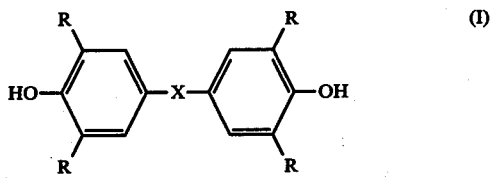

in which

R is identical or different and denotes H, $C_1$—$C_4$—alkyl, Cl or Br; preferably H or $C_1$—$C_4$—alkyl, and in which X is a bond, $C_1$—$C_8$—alkylene, $C_2$—$C_8$—alkylidene, $C_5$—$C_{15}$—cycloalkylene, $C_5$—$C_{15}$—cycloalkylidene, —S—, —SO$_2$—, —SO—, —CO— or

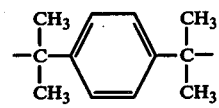

Examples of these bisphenols are: 4,4'-dihydroxydiphenyl, 2,2-bis-(4-hydroxyphenyl)-propane (bisphenol A), 2,4-bis-(4-hydroxyphenyl)-2-methylbutane, 1,1-bis-(4-hydroxyphenyl)-cyclohexane, α,α-bis-(4-hydroxyphenyl)-p-diisopropyl-benzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α-bis-(3,5-dimethyl-4-hydroxyphenyl)-p-diisopropyl-benzene, 2,2-bis-(3,5-dichloro-4-hydroxyphenyl)-propane and 2,2-bis-(3,5-dibromo-4-hydroxyphenyl)-propane (tetrabromo bisphenol A).

Examples of particularly preferred bisphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane and 1,1-bis-(4-hydroxyphenyl)-cyclohexane.

Preferred aromatic polycarbonates are those which are based on one or more of the bisphenols mentioned as being preferred. Particularly preferred copolycarbonates are those based on 2,2-bis-(4-hydroxyphenyl)-propane and one of the other bisphenols mentioned as being particularly preferred. Further particularly preferred polycarbonates are those based solely on 2,2-bis-(4-hydroxyphenyl)-propane or 2,2-bis-(3,5-dimethyl-4-hydroxyphenyl)-propane.

The aromatic high-molecular weight polycarbonates can be branched due to the incorporation of small amounts, preferably of between about 0.05 and 2.0 mol % (relative to diphenols employed), of trifunctional or more than trifunctional compounds, especially compounds with three or more phenolic hydroxyl groups.

Polycarbonates of this type are described, for example, in German Offenlegungsschriften (German Published Specifications) 1,570,533, 1,595,762, 2,116,974 and 2,113,347, British Patent Specification No. 1,079,821 and U.S. Patent Specification No. 3,544,514 (incorporated herein by reference).

Some examples of compounds with three or more than three phenolic hydroxyl groups which can be used are phloroglucinol, 4,6-dimethyl-2,4,6-tri-(4-hydroxyphenyl)-heptane-2,4,6-dimethyl-2,4,6-tri-(4-hydroxyphenyl)-heptane, 1,4,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methylbenzyl)-4-methylphenol, 2-(4-hydroxyphenyl)-2-(2,4-dihydroxyphenyl)-propane, hexa(4-(4-hydroxyphenylisopropyl)phenyl) orthoterephthalic acid ester, tetra-(4-hydroxyphenyl)-methane, tetra-(4-(4-hydroxyphenylisopropyl)-phenoxy)-methane and 1,4-bis-((4',4''-dihydroxytriphenyl)-methyl)-benzene. Some of the other trifunctional compounds are 2,4-dihydroxybenzoic acid, trimesic acid, cyanuric chloride and 3,3-bis-(4-hydroxyphenyl)-2-oxo-2,3-dihydroindole.

The reusable polycarbonate containers of the present invention should contain an effective amount of nontoxic pigment to filter out the portion of the visible spectrum of from about 380 to 550 nm. Preferably, from about 0.10 to 2.00 wt. %, based on the weight of the polycarbonate, of pigment is used. Most preferably, from about 0.20 to 1 wt. % of pigment is used. Suitable pigments include Amaplast Yellow GHS (Drakenfeld) and are believed to include Amaplast Orange LFP, Macrolex Orange GG, Macrolex Red EG, Macrolex Orange 3G and Amaplast Red 2Y.

The incorporation of the pigment into the polycarbonate can be accomplished by any suitable technique known in the art which will bring about the thorough distribution of the pigment into the polycarbonate such as, for example, by the use of mixing rollers, dough mixers, Banbury mixers, extruders and the like.

During the blending process, it is also possible to admix additional additives such as stabilizers, flame retarders, flow agents, lubricants and antistatic agents in a known manner.

The invention will be further illustrated, but is not intended to be limited, by the following example.

Suitable reusable, transparent, pigmented polycarbonate containers of the invention may be formed by well-known techniques, such as extrusion blow molding, injection blow molding, rotational molding, thermoforming, injection molding and lamination.

EXAMPLE

Mixed herd milk routinely supplied to the Pennsylvania State University Creamery was used in this example.

The raw milk (up to 2 days old) was pasteurized at 74° C. for 16 sec., homogenized at 2500 psig, cooled to 6° C., and transferred directly into 6-gallon stainless steel dispenser cans. The milk containers were immediately filled by hand and placed into a commercial double sliding door display case held at 7 ± 1° C. One each of the five types of containers was examined for flavor and riboflavin content after exposure to fluorescent light for 3, 6, 12, 24, 48 and 72 hours. The milk was not agitated during storage. An unexposed (dark) sample from the same lot of milk designated as control was held at the same temperature in a 6-gallon stainless steel can. At each time interval a control sample was obtained for analyses. The display case was illuminated by cool white fluorescent lamps (F 40 CW) mounted parallel to the shelves at a distance of 45.7 cm from the containers. Illumination averaged 100 ft. candles perpendicular to the light source at the mid-point of the exposed container vertical surface. All light measurements were conducted with a Weston illumination meter (Model 756).

Four conventional one-gallon milk containers were used in the Example — a one-gallon, clear glass bottle; a one-gallon, clear polycarbonate bottle; a one-gallon, high density polyethylene bottle tinted with titanium dioxide; and a commercial one-gallon, fiberboard container. Additionally, a reusable, pigmented, polycarbonate container in accordance with the invention was also used. This pigmented polycarbonate container contained about 0.20 wt. % of Amaplast Yellow GHS pigment.

At each exposure time, the containers were removed from the display case, mixed by inversion, and aliquots were transferred to 30 ml. medicine cups in dim light. All samples were transferred and presented to taste panel members with 15 min. The trained taste panel consisted of 11 women from a pool of 20 women, all of whom had from 2 to 8 years experience in organoleptic evaluation with numerous food products. Preference evaluation was obtained using a 9-point hedonic scale (1-dislike extremely; 9-like extremely) and a multiple comparison test using the control sample as a reference.

Results of the panel evaluation of homogenized milk from the five containers and the control are found in Table 1.

Riboflavin was determined in duplicate for each trial by the fluorometric method and the results are reported in Table 2.

The light transmission characteristics of the five (5) one-gallon milk containers are reported in Table 3.

Table 1

Effect of container on organoleptic response of the panel members to homogenized milk exposed to fluorescent light.

| | No. of Samples | EXPOSURE TIME (hr) | | | | | |
|---|---|---|---|---|---|---|---|
| | | 0 | 3 | 6 | 12 | 24 | 48 | 72 |
| Control | 44 | 6.5 | 6.6 | 6.4 | 6.8 | 6.9 | 7.0 | 6.7 |
| Glass | 22 | 6.3 | 6.4 | 6.5 | 5.1 | 3.3 | 2.4 | 2.6 |
| Clear - PC* | 44 | 6.5 | 5.9 | 5.9 | 4.9 | 3.2 | 3.5 | 2.8 |
| Tinted - PC* | 44 | 6.5 | 6.0 | 6.4 | 6.0 | 6.6 | 5.0 | 4.1 |
| HDPE | 22 | 6.3 | 5.9 | 6.0 | 5.7 | 3.2 | 2.8 | 2.7 |
| Fiberboard | 44 | 6.5 | 5.8 | 6.1 | 6.5 | 6.6 | 6.5 | 6.0 |

Hedonic scores from 1, dislike extremely; to 9, like extremely.

It is noted that the transparent, tinted polycarbonate container gives the milk contained therein a creamy and pleasing appearance.

Table 2

Effect of container on riboflavin content in homogenized milk exposed to fluorescent light.

| | No. of samples | EXPOSURE TIME (hr) | | | | | |
|---|---|---|---|---|---|---|---|
| | | 0 | 3 | 6 | 12 | 24 | 48 | 72 |
| Control | 4 | 1.70 | 1.73 | 1.82 | 1.82 | 1.97 | 1.83 | 1.92 |
| Glass | 2 | | 1.63 | 1.72 | 1.58 | 1.67 | 1.63 | 1.40 |
| Clear - PC* | 4 | | 1.68 | 1.68 | 1.70 | 1.91 | 1.74 | 1.66 |
| Tinted- PC* | 4 | | 1.71 | 1.77 | 1.92 | 1.74 | 1.97 | 1.80 |
| HDPE | 2 | | 1.63 | 1.63 | 1.86 | 1.81 | 1.60 | 1.72 |
| Fiberboard | 4 | | 1.65 | 1.53 | 1.66 | 1.73 | 1.84 | 1.74 |

*Polycarbonate

Table 3

Light Transmission Characteristics of the One-Gallon Milk Containers

| Container | % Transmission |
|---|---|
| Glass | 91 |
| Clear Polycarbonate (Clear-PC) | 90 |
| Tinted Polycarbonate (Tinted-PC) | 75 |
| High Density Polyethylene (HDPE) | 57 |
| Fiberboard | 4 |

A review of the above data indicates that only the transparent, pigmented, polycarbonate reusable container is almost as effective as the fiberboard container in screening out the deleterious light wavelengths in the visable spectrum and in maintaining the flavor and quality of the milk compared to the dark control sample while simultaneously giving the milk an aesthetic and pleasing appearance. A reusable, polycarbonate container has, therefore, now been developed which permits the prospective purchasers to see its contents, but which simultaneously filters out the deleterious portion of the visible light spectrum of from about 380 to 550 nm.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A transparent, pigmented, polycarbonate container formed from a polycarbonate having intimately incorporated therein an effective amount of pigment to selectively filter out the portion of the visible spectrum from about 380 to 550 nm.

2. The transparent, pigmented, polycarbonate container of claim 1 wherein the pigment is incorporated into the polycarbonate in about 0.10 to 2 weight %, based on the weight of the polycarbonate.

3. The transparent, pigmented, polycarbonate container of claim 2 wherein the pigment is incorporated into the polycarbonate in about 0.20 to 1 weight %, based on the weight of the polycarbonate.

4. A transparent, pigmented, polycarbonate milk container formed from a polycarbonate having intimately incorporated therein an effective amount of a pigment to selectively filter out the portion of the visible spectrum from about 380 to 550 nm.

5. A process for producing a polycarbonate container which selectively filters out the portion of the visible spectrum from about 380 to 550 nm comprising intimately incorporating an effective amount of pigment into the polycarbonate from which the container is formed to filter out said portion of the visible spectrum.

6. The process of claim 5 wherein the pigment is intimately incorporated into the polycarbonate from which the container is formed in from about 0.10 to 2 weight %, based on the weight of the polycarbonate.

* * * * *